United States Patent
Sugitani et al.

(10) Patent No.: US 8,215,439 B2
(45) Date of Patent: Jul. 10, 2012

(54) DRY CLUTCH, AND MOTORCYCLE EQUIPPED WITH THE SAME

(75) Inventors: Tsuyoshi Sugitani, Shizuoka (JP); Mitsukazu Takebe, Shizuoka (JP); Fumio Takeda, Shizuoka (JP); Atsushi Aoyama, Shizuoka (JP); Kotaro Katsuno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 416 days.

(21) Appl. No.: 12/508,928

(22) Filed: Jul. 24, 2009

(65) Prior Publication Data

US 2009/0277710 A1    Nov. 12, 2009

Related U.S. Application Data

(63) Continuation-in-part of application No. PCT/JP2008/052733, filed on Feb. 19, 2008.

(30) Foreign Application Priority Data

Feb. 20, 2007  (JP) ................................. 2007-039255

(51) Int. Cl.
  *B62M 9/16*   (2006.01)
  *F16D 13/00*  (2006.01)
(52) U.S. Cl. ...................... 180/231; 180/219; 192/113.1
(58) Field of Classification Search .................. 180/231, 180/219; 192/113.1
See application file for complete search history.

(56) References Cited

U.S. PATENT DOCUMENTS

| | | | |
|---|---|---|---|
| 6,006,869 A | 12/1999 | Rancourt et al. | |
| 7,163,074 B2 * | 1/2007 | Inomori et al. | 180/219 |
| 2006/0090944 A1 * | 5/2006 | Ishida et al. | 180/219 |

FOREIGN PATENT DOCUMENTS

| | | |
|---|---|---|
| EP | 0 731 287 A1 | 9/1996 |
| EP | 1 323 942 A1 | 7/2003 |
| EP | 1 564 428 A1 | 8/2005 |
| GB | 575 996 A | 3/1946 |
| JP | 3-292385 A | 12/1991 |
| JP | 8-232981 A | 9/1996 |
| WO | 96/36681 A1 | 11/1996 |
| WO | 2006/006437 A1 | 1/2006 |

OTHER PUBLICATIONS

Official Communication issued in corresponding European Patent Application No. 08 71 1557, completed on Jun. 21, 2011.

* cited by examiner

*Primary Examiner* — Lesley D Morris
*Assistant Examiner* — Marlon Arce
(74) *Attorney, Agent, or Firm* — Keating & Bennett, LLP (57) ABSTRACT

In some preferred embodiments, the dry clutch is capable of suppressing transmission of engine rotational fluctuations from the engine to a rider via a vehicle body. In the dry clutch including a driving member (clutch shoe) 66 and a driven member (clutch drum) 62 configured to be engaged with each other and disengaged from each other in a non-lubricating atmosphere to transmit/intercept the motive power of the engine to a drive wheel, a solid lubricant 70 is interposed between the driving member 66 and the driven member 62.

18 Claims, 11 Drawing Sheets

DRY CLUTCH, AND MOTORCYCLE EQUIPPED WITH THE SAME

RELATED APPLICATIONS

This application is a Continuation-In-Part of International Patent Application No. PCT/JP2008/052733 filed on Feb. 19, 2008. This application claims priority under 35 U.S.C. §119 to Japanese Patent Application No. 2007-039255 filed on Feb. 20, 2007. Each of the entire disclosures of the above PCT and Japanese applications are incorporated herein by reference in its entirety.

BACKGROUND

1. Field of the Invention

The preferred embodiments of the present invention relate, inter alia, to a dry clutch for transmitting and intercepting power from an engine to a drive wheel by engaging and disengaging a driving member and a driven member. They also relate to a motorcycle equipped with the dry clutch.

2. Description of the Related Art

The following description sets forth the inventor's knowledge of related art and problems therein and should not be construed as an admission of knowledge in the prior art.

For example, scooter type motorcycles are generally constructed such that a unit swing type engine unit provided with an engine body and a V-belt type continuously variable transmission is supported by a body frame in an up-and-down swingable manner.

In such a V-belt type continuously variable transmission, it generally employs the structure in which a V-belt is put on a driving pulley connected to a crankshaft and a driven pulley connected to a rear wheel shaft and a dry clutch is arranged on a side of the driven pulley for transmitting/intercepting the engine motive power to the driven pulley side.

A conventional dry clutch of this kind is described in Japanese Unexamined Laid-open Patent Publication No. H07-119764 (hereinafter referred to as "Patent Document 1"). In this conventional dry clutch, a clutch shoe is arranged on a side of a driving shaft to which engine motive power is steadily transmitted and a clutch drum is arranged on a side of a driven shaft connected to a rear wheel, so that the centrifugal force generated by the rotation of the driving shaft causes the clutch shoe to be engaged with the clutch drum to thereby transmit the engine motive power to the rear wheel.

The aforementioned conventional dry clutch has a problem in that rotational fluctuations of the crankshaft due to the reciprocating motions of the piston are transmitted to the clutch drum via the clutch shoe, which transmits the rotational fluctuations to the rider as vibrations of the vehicle body. Such vibrations are often generated particularly in a state in which the clutch shoe is new and the clutch is not fully engaged at the time of acceleration/deceleration of the vehicle. Improvements in this respect have been demanded.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a dry clutch capable of suppressing transmission of rotational fluctuations of an engine to a rider via a vehicle body.

Among other potential advantages, some embodiments can provide a motorcycle equipped with the dry clutch.

According to the first aspect of the present invention, in a dry clutch configured to transmit and intercept motive power by engaging a driving member and a driven member with each other and disengaging them from each other in a non-lubricating atmosphere, a solid lubricant is interposed between the driving member and the driven member.

In the aforementioned dry clutch, since the solid lubricant is interposed between the driving member and the driven member, the solid lubricant decreases rotational fluctuations to be transmitted from the driving member to the driven member, resulting in smooth torque transmission. Thereby, by adopting the dry clutch for a transmission of, e.g., a motorcycle, the engine rotational fluctuations can be absorbed by the solid lubricant, which prevents the rotational fluctuations from being transmitted to a rider via a vehicle body.

According to the second aspect of the present invention, a motorcycle is equipped with the aforementioned dry clutch. The motorcycle includes a dry type transmission, and a transmission chamber which accommodates the transmission, and the dry clutch is arranged in the transmission chamber.

In the motorcycle, since it is equipped with the aforementioned dry clutch, the same effects as mentioned above can be attained.

In this document, the language "motorcycle" is to be construed broadly and encompasses various motorized vehicles that are ridden by one or more rider, including, e.g., motorbikes, scooters, mopeds and other similar vehicles, which can include two wheeled vehicles and vehicles having more than two wheels.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those skilled in the art based on these illustrated embodiments.

First Embodiment

Embodiments of the invention will be described below with reference to the accompanying drawings. FIGS. 1 to 8 are explanatory views showing a motorcycle equipped with a dry clutch according to a first embodiment of the invention. Note that, "front," "back," "left," and "right" in the description of this disclosure mean "front," "back," "left," and "right" directions as viewed from a rider seated on a seat, respectively, unless otherwise specified.

Figure 1:
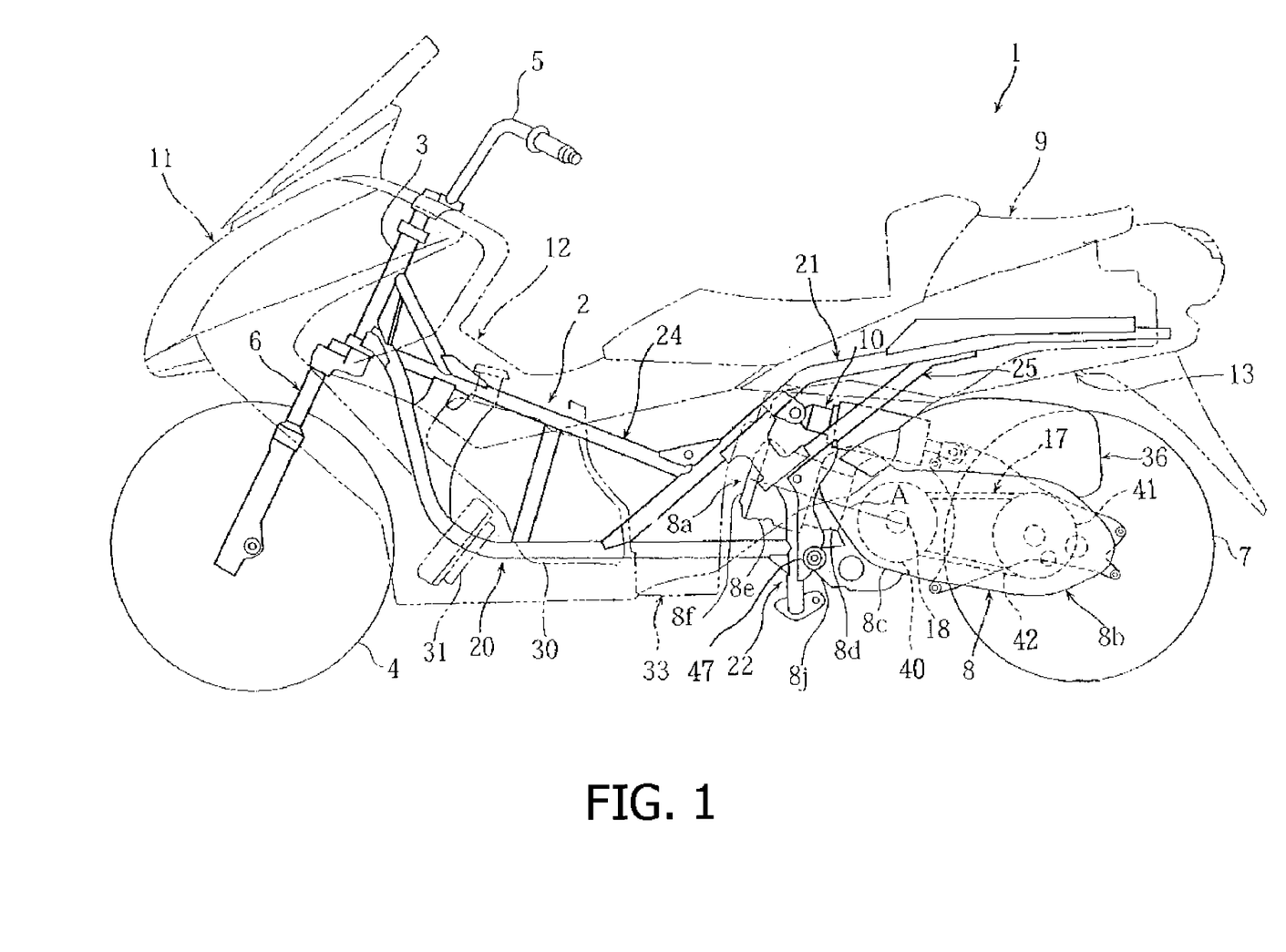
FIG. 1 is a schematic side view showing a motorcycle equipped with a dry clutch according to a first embodiment of the invention.

In the drawings, the reference numeral "1" denotes a scooter type motorcycle. The motorcycle 1 comprises an underbone-type body frame 2, a front fork 6 rotatably supported rightward and leftward by a head pipe 3 positioned at a front end of the body frame 2 with the lower end connected to a front wheel 4 and the upper end connected to a steering handle 5, a unit swing type engine unit 8 having a front portion supported by the body frame 2 in an up-and-down swingable manner and a rear end portion provided with a rear wheel 7, and a double straddle-type seat 9 mounted above the engine unit 8 on the body frame 2.

The front side of the front fork 6 is covered by a front cover 11, the rear side thereof is covered by a leg shield 12, and the lower periphery of the seat 9 is covered by a side cover 13. A low floor foot board (not shown) is arranged between the leg shield 12 and the side cover 13.

The body frame 2 includes right and left downtubes 20 and 20 extending rearward and downward while diverging from the head pipe 3 in the vehicle widthwise direction and then extending from the respective lower ends rearward and substantially horizontally, right and left seat frames 21 and 21 extending from the midway portion of the right and left downtubes 20 obliquely upward and rearward and then extending from the respective rear ends rearward and substantially horizontally, and right and left engine suspension frames 22 and 22 extending vertically from the rear ends of the right and left downtubes 20 with the upper ends connected to the right and left seat frames 21.

The body frame 2 includes right and left upper tubes 24 and 24 extending from the head pipe 3 rearward and substantially straight with rear ends thereof connected to the right and left seat frames 21 and 21, right and left seat stays 25 and 25 connecting the right and left engine suspension frames 22 and 22 and the seat frames 21 and 21, and a cross member 23 connecting the vicinities of connecting portions of the right and left seat frames 21 and 21 to which the engine suspension frames 22 are connected in the vehicle widthwise direction.

A rear suspension 10 is interposed between the cross member 23 and the engine unit 8. A storage box 33 is arranged below the seat 9 on the body frame 2, a fuel tank 30 is arranged in front of the storage box 33, and a radiator 31 is arranged below the fuel tank 30.

The engine unit 8 is constructed such that an engine body 8a and a transmission case 8b having a transmission chamber accommodating a V-belt type continuously variable transmission 17 are integrally joined.

In this engine unit 8, the lower portion of the engine body 8a is directly supported by the body frame 2 in a swingable manner. The engine unit 8 is structured as explained below.

Figure 2:
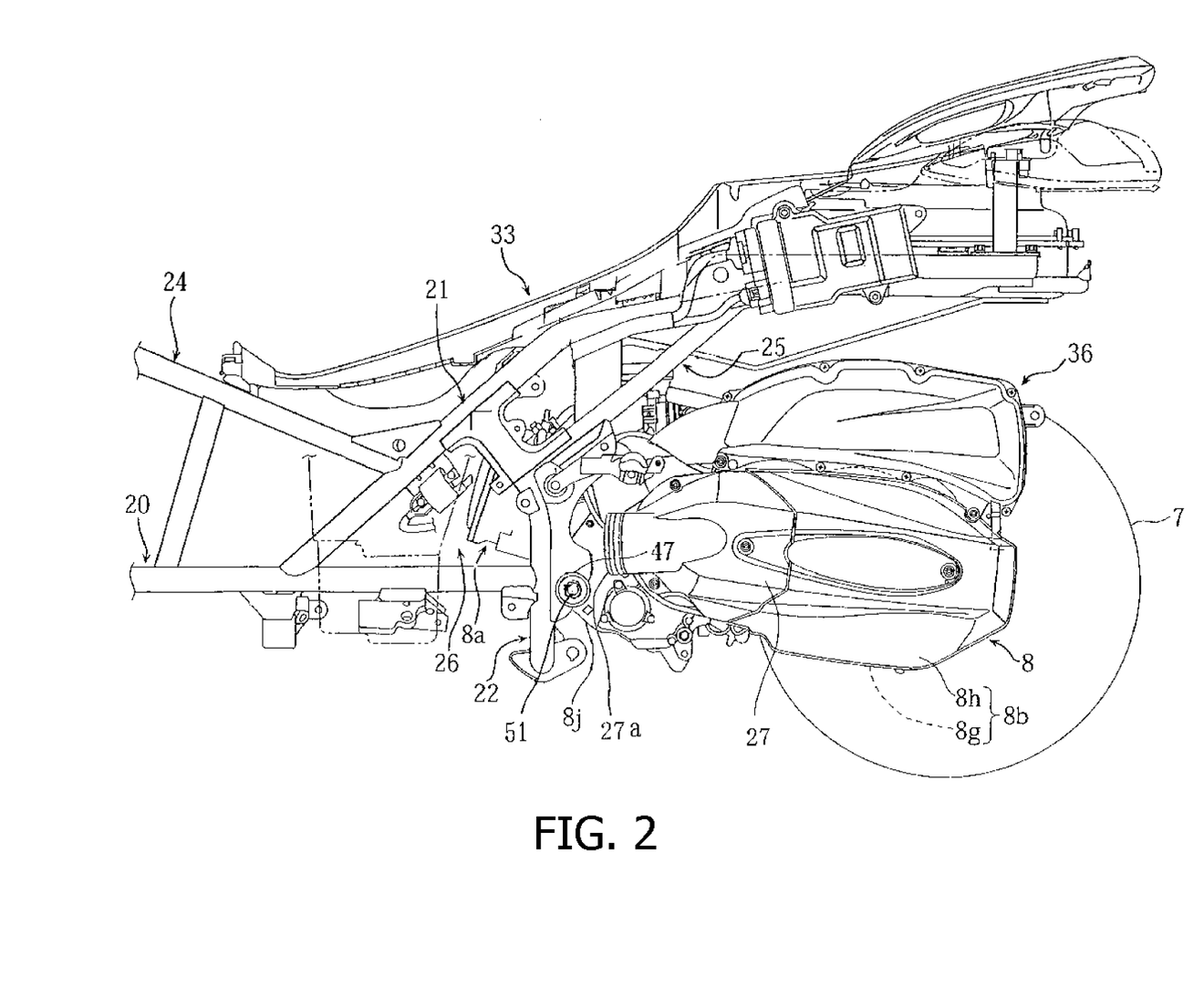
FIG. 2 is a side view showing an engine unit mounted on a body frame of the motorcycle.
Figure 3:
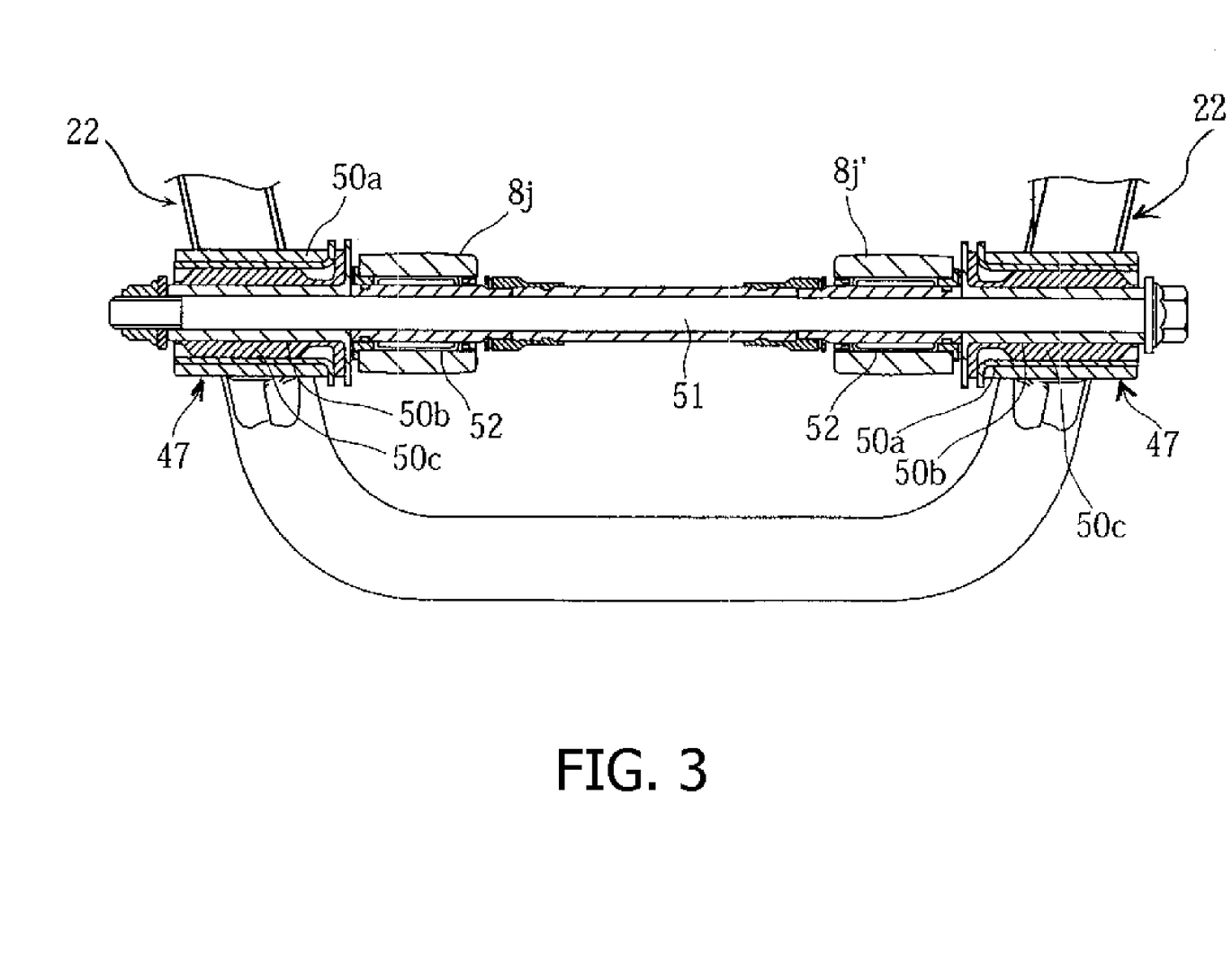
FIG. 3 is a cross-sectional view showing a support of the body frame for the engine unit.

As shown in FIGS. 2 and 3, in the vicinities of the right and left sides of the engine suspension frame 22 to which the downtubes 20 are connected, pivot members 47 and 47 are arranged with the axes thereof directed in the vehicle width direction, and a pivot shaft 51 is inserted into the right and left pivot members 47 and 47.

As shown in FIG. 3, the right and left pivot members 47 are each structured such that a rubber bush 50c is fixed by, e.g., baking, between an outer cylinder 50a fixed to the engine suspension frame 22 and an inner cylinder 50b in which the pivot shaft 51 is inserted.

Figure 5:
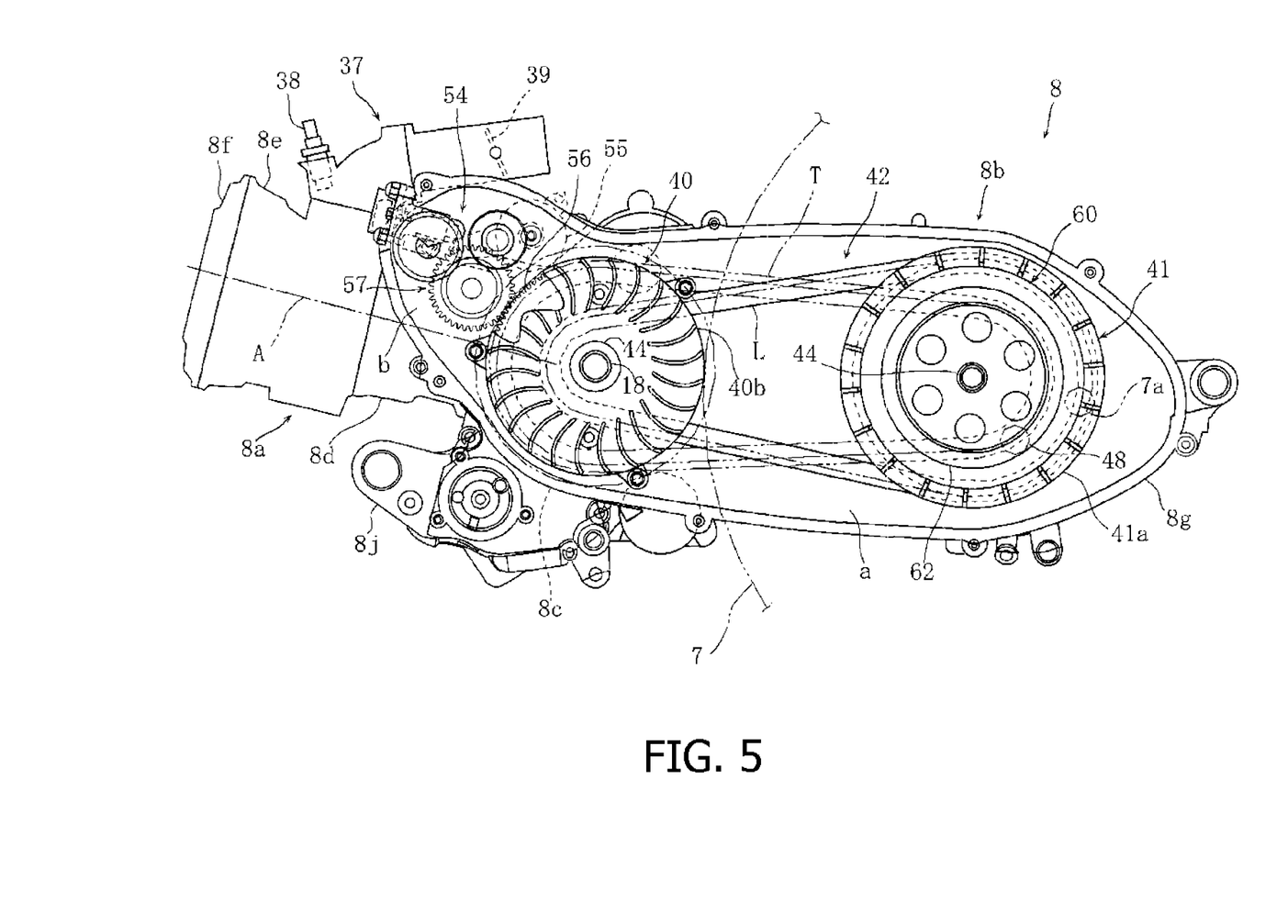
FIG. 5 is a side view showing a V-belt type continuously variable transmission of the engine unit.

As shown in FIG. 5, the bottom wall of a crankcase 8c of the engine body 8a is integrally provided with a pair of right and left suspension arm portions 8j and 8j in a forwardly protruded manner. As shown in FIG. 3, the right and left suspension arm portions 8j and 8j are each arranged on the inside of the pivot member 47 on the pivot shaft 51 and swingably supported by the pivot shaft 51 via a bearing 52.

Figure 4:
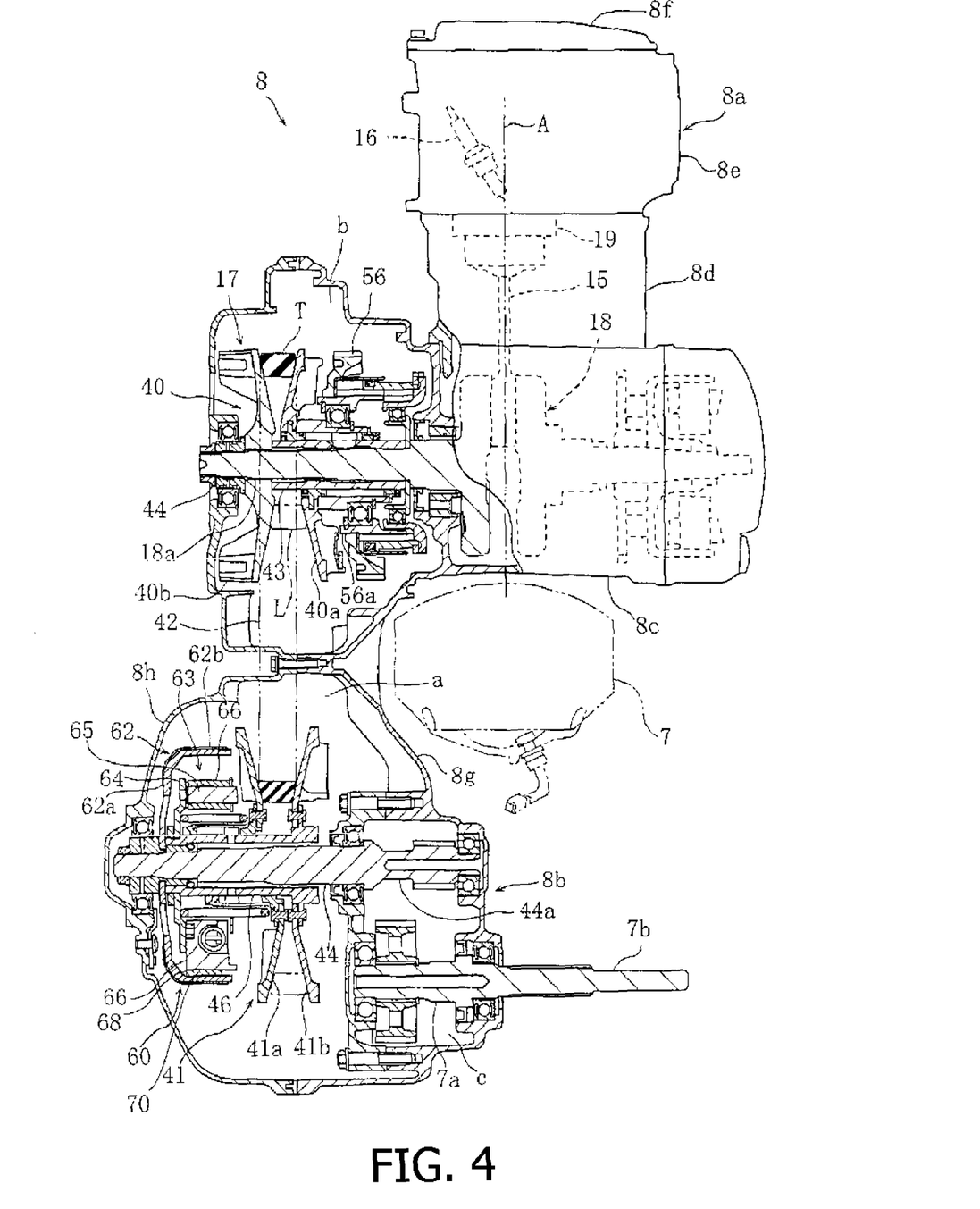
FIG. 4 is a partially cross-sectioned plan view showing the engine unit.

The engine body 8a is comprised of a water-cooled type four-stroke single cylinder engine mounted with the cylinder axis line "A" directed generally horizontally. As shown in FIGS. 4 and 5, the engine body 8a is constructed as follows. A cylinder block 8d slidably accommodating a piston 19 is joined to the front mating surface of the crankcase 8c accommodating a crankshaft 18 extended in the vehicle width direction. A cylinder head 8e in which a spark plug 16 and intake and exhaust cam shafts (not shown) are arranged is joined to the front mating surface of the cylinder block 8d. A head cover 8f is mounted to the cylinder head 8e. The piston 19 is connected to the crankshaft 18 via a connecting rod 15.

As shown in FIG. 5, an intake pipe 37 communicated with an intake port is connected to the upper wall surface of the cylinder head 8e. A fuel injection valve 38 is provided at the downstream end portion of the intake pipe 37, while a throttle valve 39 is provided in the intake pipe 37 on the upstream side of the fuel injection valve 38. An upstream end of the intake pipe 37 is connected to an air cleaner 36 fixed to an upper wall surface of the transmission case 8b (see FIG. 2).

As shown in FIG. 4, the transmission case 8b includes a case body 8g integrally formed so as to extend rearward from the left side wall of the crankcase 8c, and a case cover 8h detachably mounted to the left mating surface of the case body 8g.

As shown in FIG. 2, a cooling-air introducing duct 27 having a cooling-air introducing inlet 27a opened toward a vehicle front is detachably mounted to an outside of the case cover 8h. A travel wind introduced from the cooling-air introducing inlet 27a flows rearward in the transmission chamber "a" from the front end of the transmission case 8b and is exhausted outside from the rear end of the transmission case 8b while cooling driving and driven pulleys 40 and 41 and a V-belt 42, which will be described later.

The V-belt type continuously variable transmission 17 is structured such that the V-belt 42 is put on the driving pulley 40 mounted to the axially left end portion 18a of the crankshaft 18 protruded in the transmission case 8b and the driven pulley 41 arranged at the rear end of the transmission case 8b.

The driving pulley 40 includes a cylindrical drive shaft member 43 spline-fitted to the crankshaft 18 so as to be rotated therewith, a movable sheave 40a mounted on the drive shaft member 43 so as to be rotated therewith in an axially movable manner, and a fixed sheave 40b axially immovably fixed to the left end portion 18a of the crankshaft 18 by a lock nut 44.

The driven pulley 41 includes a cylindrical driven shaft member 46 rotatably mounted to a rotating shaft 44 rotatably supported by the transmission case 8b, a fixed sheave 41b fixed to the driven shaft member 46 so as to be rotated therewith in an axially immovable manner, and a movable sheave 41a mounted to the driven shaft member 46 so as to be rotated together with the fixed sheave 41b in an axially movably manner.

Figure 6:
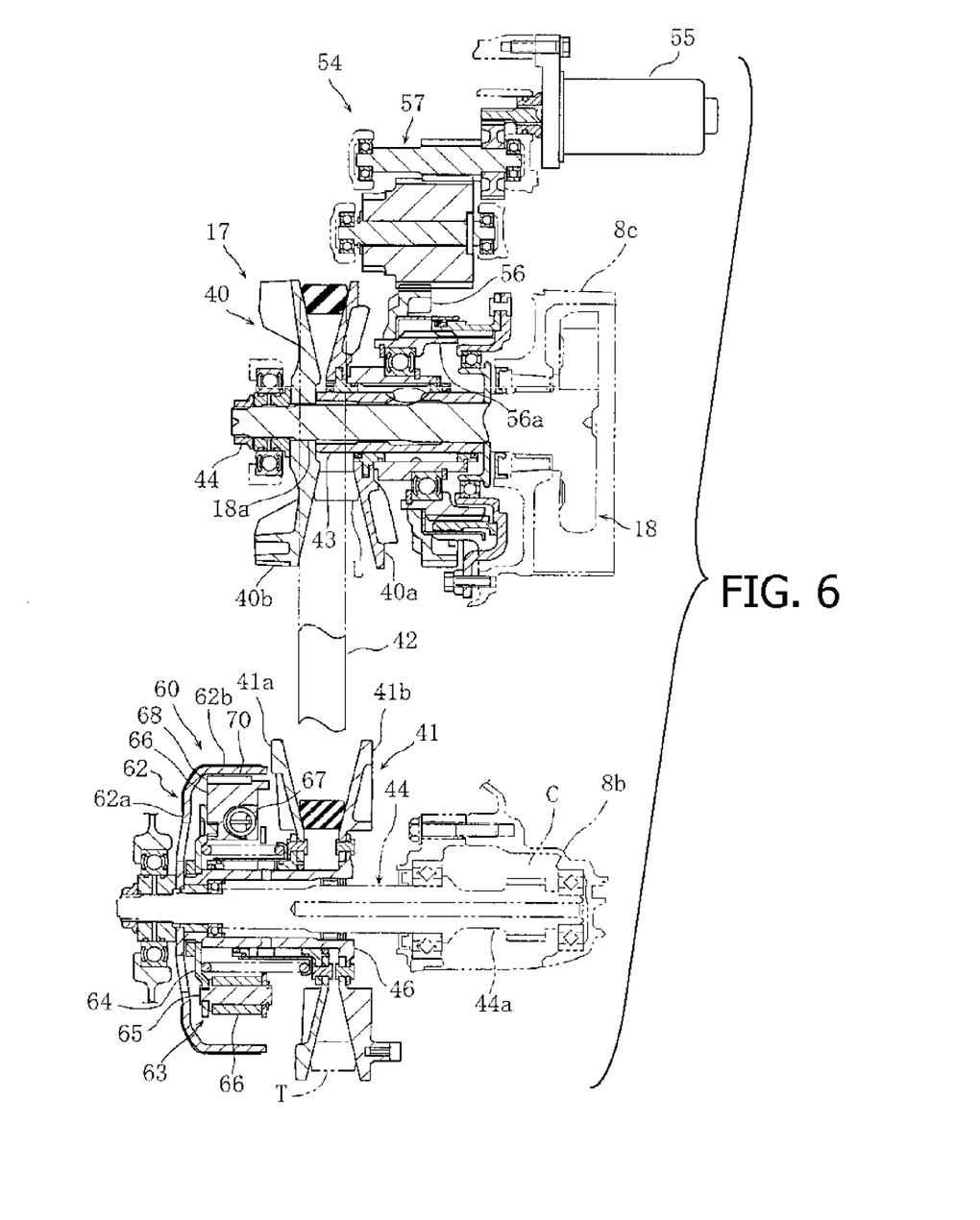
FIG. 6 is a cross-sectional view showing the V-belt type continuously variable transmission in which a centrifugal clutch is arranged.
Figure 8:
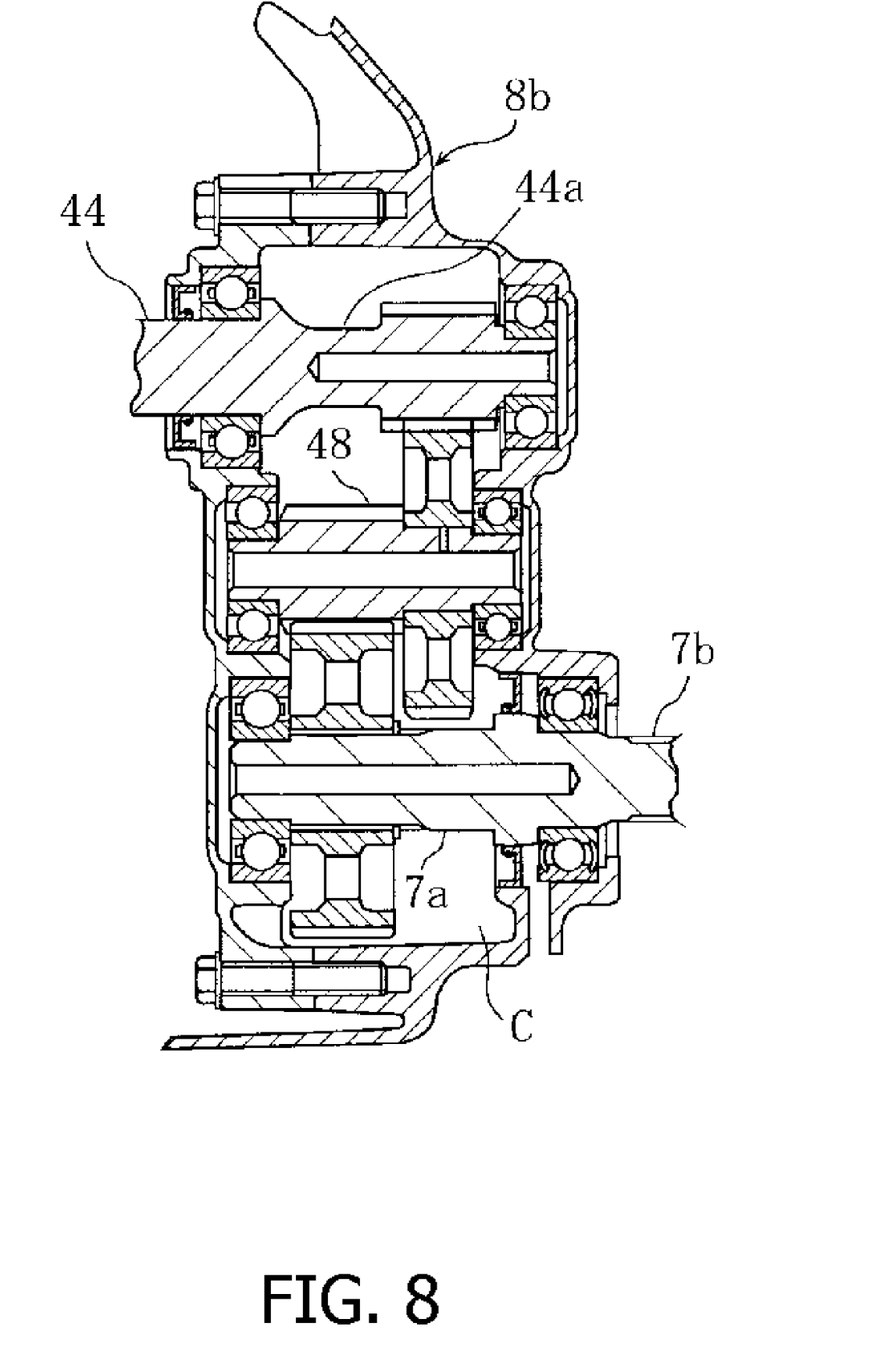
FIG. 8 is a cross-sectional view showing a rear end of the engine unit.

As shown in FIGS. 6 and 8, the right end portion 44a of the rotating shaft 44 is inserted into a gear chamber "c" formed independently of the transmission chamber "a" of the transmission case 8b. An intermediate speed reduction shaft 48 and a rear wheel shaft 7a are arranged in parallel to the rotating shaft 44 within the gear chamber "c." A right end portion 7b of the rear wheel shaft 7a projects inwardly from the transmission case 8b, and the rear wheel 7 is mounted to the right end portion 7b.

The V-belt type continuously variable transmission 17 is equipped with a belt wound diameter varying device 54 (see FIG. 5) configured to vary the belt wound diameter of the driving pulley 40 between the low position "L" and the top position "T" by a controller (not shown) on the basis of the engine rotating speed, vehicular speed, etc. The belt wound diameter varying device 54 is arranged in a wound diameter control chamber "b" protruded obliquely forward and upward and formed at the front end portion of the transmission case 8b.

The belt wound diameter varying device 54 includes a drive motor 55, a reciprocating drive gear 56 for varying the belt wound diameter by moving the movable sheave 40a of the driving pulley 40 in the axial direction, a reduction gear unit 57 for transmitting the rotation of the drive motor 55 to the reciprocating drive gear 56, and a feed screw member 56a for converting the rotation of the reciprocating drive gear 56 into axial movements of the movable sheave 40a. The rotation of the reciprocating drive gear 56 causes the axial movement of the feed screw member 56a together with the movable sheave 40a by the distance corresponding to the rotational amount of the drive motor 55 to thereby vary the belt wound diameter.

A dry clutch 60 is mounted outwardly of the driven pulley 41 on the rotating shaft 44 in the transmission chamber "a" of the transmission case 8b. The dry clutch 60 includes a clutch body (driving member) 63 fixed to the driven shaft member 46 so as to be rotated therewith and a clutch drum (driven member) 62 fixed to the rotating shaft 44 so as to be rotated therewith by a lock nut 61.

The clutch drum 62 is a generally bowl-shaped member opened inwardly in the vehicle width direction and includes a disk portion 62a fixed to the rotating shaft 44 and a cylindrical portion 62b extending inwardly from the outer peripheral edge of the disk portion 62a. The clutch body 63 is arranged in the cylindrical portion 62b.

Figure 7:
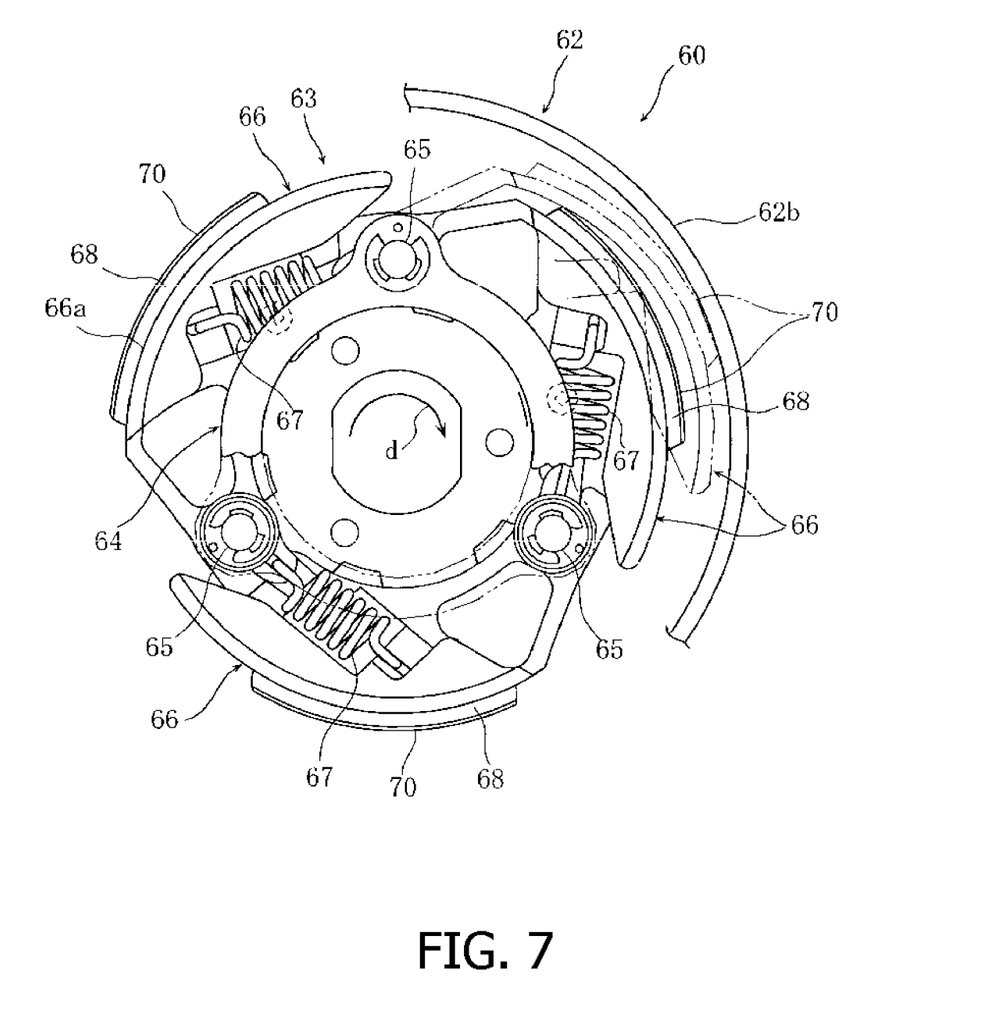
FIG. 7 is a side view showing the centrifugal clutch as viewed from the inside thereof.

As shown in FIG. 7, the clutch body 63 includes a clutch plate 64 fixed to the driven shaft member 46, three support pins 65, 65 and 65 circumferentially arranged in the clutch plate 64 at predetermined angular intervals, clutch shoes (driving members) 66, 66 and 66 each pivotally supported by the corresponding support pin 65 so as to extend from the support pin 65 in the rotating direction "d" of the driven pulley 41, coil springs 67, 67 and 67 each connecting the intermediate portion of the clutch shoe 66 and the support pin 65 of the clutch plate 64 so as to urge the clutch shoe 66 radially inward (disengaging direction), and friction plates 68, 68 and 68 each fixedly adhered on the outer peripheral surface 66a of the respective clutch shoes 66.

The engine rotation is transmitted from the engine body 8a to the driven shaft member 46 via the V-belt 42. When the centrifugal force caused by the rotation of the driven shaft member 46 becomes larger than the urging force of the coil spring 67, as shown by the phantom line in FIG. 7, each clutch shoe 66 moves radially outward about the support pin 65, causing the friction plate 68 of the clutch shoe 66 to be brought into contact with the inner peripheral surface of the cylindrical portion 62b of the clutch drum 62. This in turn causes rotation of the clutch drum 62, resulting in transmission of the rotation of the clutch drum 62 to the rear wheel 7 from the rotating shaft 44. On the other hand, when the centrifugal force caused by the engine rotation becomes smaller than the urging force of the coil spring 67, each clutch shoe 66 separates from the clutch drum 62, resulting in interception of the transmission of the engine motive power to the rear wheel 7.

In the dry clutch 60 of this embodiment, a solid lubricant 70 is interposed between the inner peripheral surface of the cylindrical portion 62b of the clutch drum 62 and outer surfaces of the friction plates 68 on the clutch shoes 66. This solid lubricant 70 is made of carbon powder having a low coefficient of friction. More specifically, the solid lubricant 70 is arranged on the clutch drum contacting outer surface of the friction plate 68. Concretely, the solid lubricant 70 is formed into a powder film or a powder layer by rubbing a carbon rod, which is formed by mixing carbon powder in clay or the like, against the outer surface of the friction plate 68. In addition, more specifically, the solid lubricant 70 also can be formed by rubbing a soft-lead, such as, e.g., a lead used for a lead of a 2B pencil. Thus, the friction plate 68 of the clutch shoe 66 is capable of coming into contact with the clutch drum 62 via the solid lubricant 70.

According to this embodiment, since the solid lubricant 70 is interposed between the clutch drum 62 and the respective clutch shoes 66 in the dry clutch 60, the solid lubricant 70 decreases rotational fluctuations transmitted from the clutch body 63 to the clutch drum 62, resulting in smooth torque transmission. Thus, the rotational fluctuations of the engine body 8a is absorbed by the solid lubricant 70, thereby suppressing the transmission of the rotational fluctuations to a rider via the vehicle body.

Generally, the friction plate 68 of the clutch shoe 66 is formed by combining a lining agent having a low coefficient of friction and a lining agent having a high coefficient of friction or mixing them. On the other hand, in cases where friction plates are new as in a new vehicle or the like, the clutch drum and friction plates are difficult to smoothly work together in the early stage of operation. Therefore, until the friction plates can smoothly work with the clutch drum, engine rotational fluctuations are liable to be transmitted to the rear wheel. In contrast, according to the embodiment, since the solid lubricant 70 is interposed between contact surfaces, the clutch drum and friction plates are liable to smoothly work together even in the early stage of operation, and the friction plates themselves will smoothly work with the clutch drum at around the time when the running-in period terminates.

Figure 9:
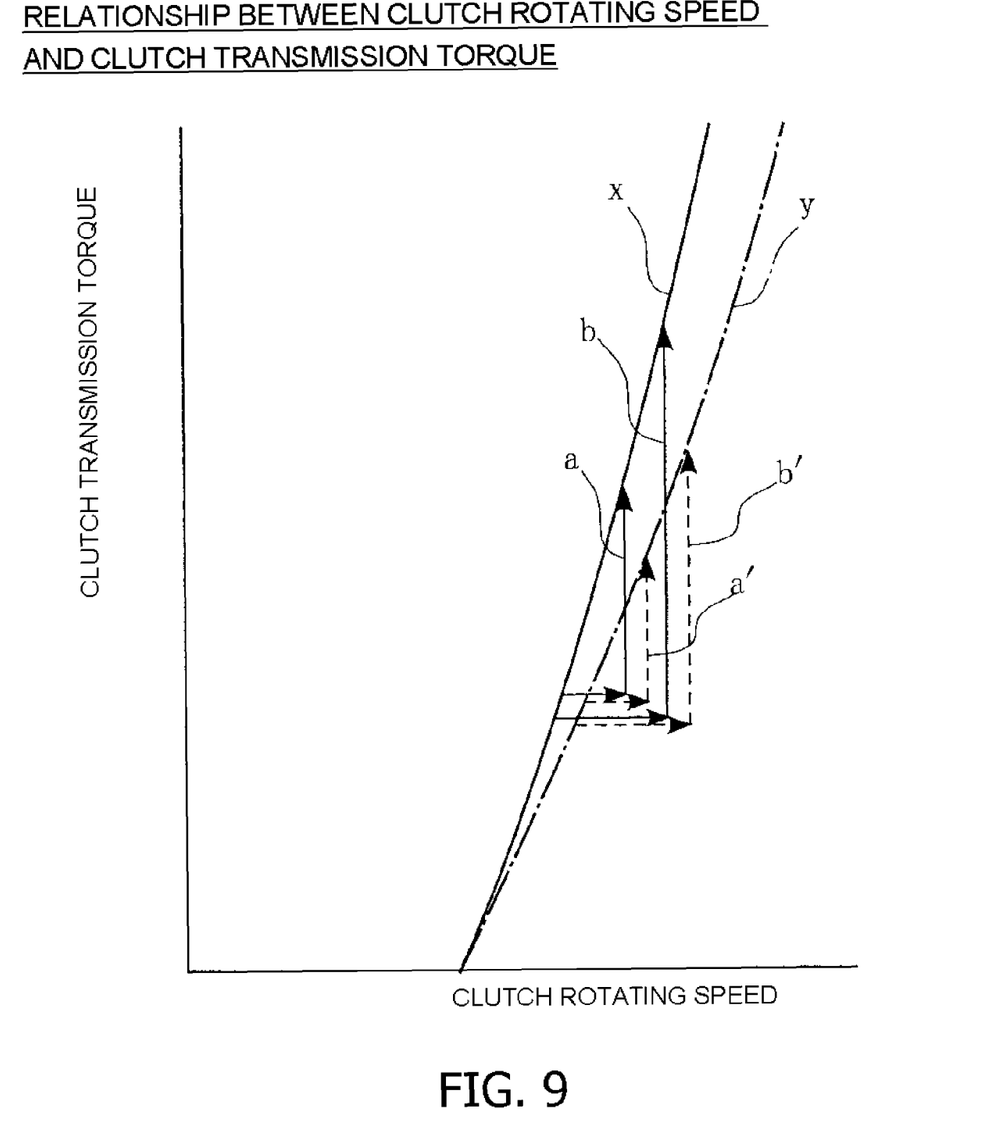
FIG. 9 is a characteristic diagram indicating the relationship between the engine rotating speed/clutch rotating speed and the clutch transmission torque.

FIG. 9 is a characteristic graph showing the relationship between the clutch rotating speed (rpm) and the clutch transmission torque (N·m). In the figure, the curve "x" indicates a torque transmission curve in the case where friction plates are new, and the curve "y" indicates a torque transmission curve in the case where a solid lubricant is interposed. Since the inclination of the curve "x," which indicates the relationship in the case where friction plates are new, is sharp, the changes "a" and "b" of the transmission torque with respect to the changes of the clutch rotating speed become large. Therefore, larger clutch rotational fluctuations cause larger transmission torque fluctuations, which in turn causes body vibrations. In contrast, since the inclination of the curve "y," which indicates the relationship in the case where a solid lubricant is interposed, is relatively gentle, the changes "a" and "b" of the transmission torque with respect to the changes of the clutch rotating speed become relatively small, which decreases the clutch transmission torque fluctuations with respect to the clutch rotating speed fluctuations even in the case where clutch plates are new. This reduces body vibrations.

In the embodiment, since the solid lubricant 70 is formed by rubbing carbon against the friction plates 68, a solid lubricant film or a solid lubricant layer low in coefficient of friction can be formed readily using a material relatively low in cost. For example, in the case of a method in which a coating agent such as a resin or the like low in coefficient of friction is applied and then heat hardening is performed, there is a drawback that it requires a heating apparatus and heating time of 1 to 2 hours, which results in increased cost.

As shown in this embodiment, in cases where the engine unit 8 is swingably attached to the body frame 2 directly, that is, without any intervening linkage or the like between, there is a problem that engine rotational fluctuations are liable to transmit to a rider as transmission torque fluctuations. In this embodiment, however, since the solid lubricant 70 is interposed in the dry clutch 60, it is possible to suppress body vibrations. As a result, it is possible to enjoy the advantage that can be attained in the case where an engine unit is directly supported by a body frame, such as, e.g., an advantage capable of enhancing a feeling of directness at the start or at the time of acceleration.

In the aforementioned embodiment, the explanation is directed to the case in which the solid lubricant 70 is provided by rubbing carbon against the friction plates 68. The present invention, however, can allow the use of a solid lubricant, such as, e.g., molybdenum disulfide, or graphite.

In the case of a solid lubricant of the aforementioned molybdenum disulfide or graphite, the solid lubricant can be intervened by applying molybdenum disulfide, or by dissolving graphite in an organic solvent and applying it with a brush.

Also in the case of employing molybdenum disulfide or graphite as mentioned above, the same effects as those in the aforementioned embodiment can be attained.

Although the solid lubricant 70 is formed on the outer surface of the friction plate 68 of the clutch shoe 66 in the aforementioned embodiment, the solid lubricant can be formed on the inner peripheral surface of the clutch drum 62.

In the aforementioned embodiment, the explanation is directed to a scooter type motorcycle in which the engine unit 8 is directly supported by the body frame 2 in an up-and-down swingable manner, in mounting the engine unit on the body frame in an up-and-down swingable manner, the present invention, of course, allows the use of a linkage mechanism or the like.

In the aforementioned embodiment, the explanation is directed to a scooter type motorcycle in which the engine unit 8 is directly supported by the body frame 2 in an up-and-down swingable manner, the present invention also can be applied to a motorcycle in which an engine unit is immovably mounted on a body frame, and further can be applied to a dry clutch mounted on an automobile, etc.

In the aforementioned embodiment, the explanation is directed to a dry clutch 60 configured to transmit engine motive power by bringing the clutch shoes 66 into contact with the clutch drum 62 by a centrifugal force generated by rotation of the driven pulley 41 and to cause separation of the clutch shoes from the clutch drum by the urging forces of the coil springs 67. The dry clutch according to the invention, however, is not limited thereto.

Second Embodiment

Figure 10:
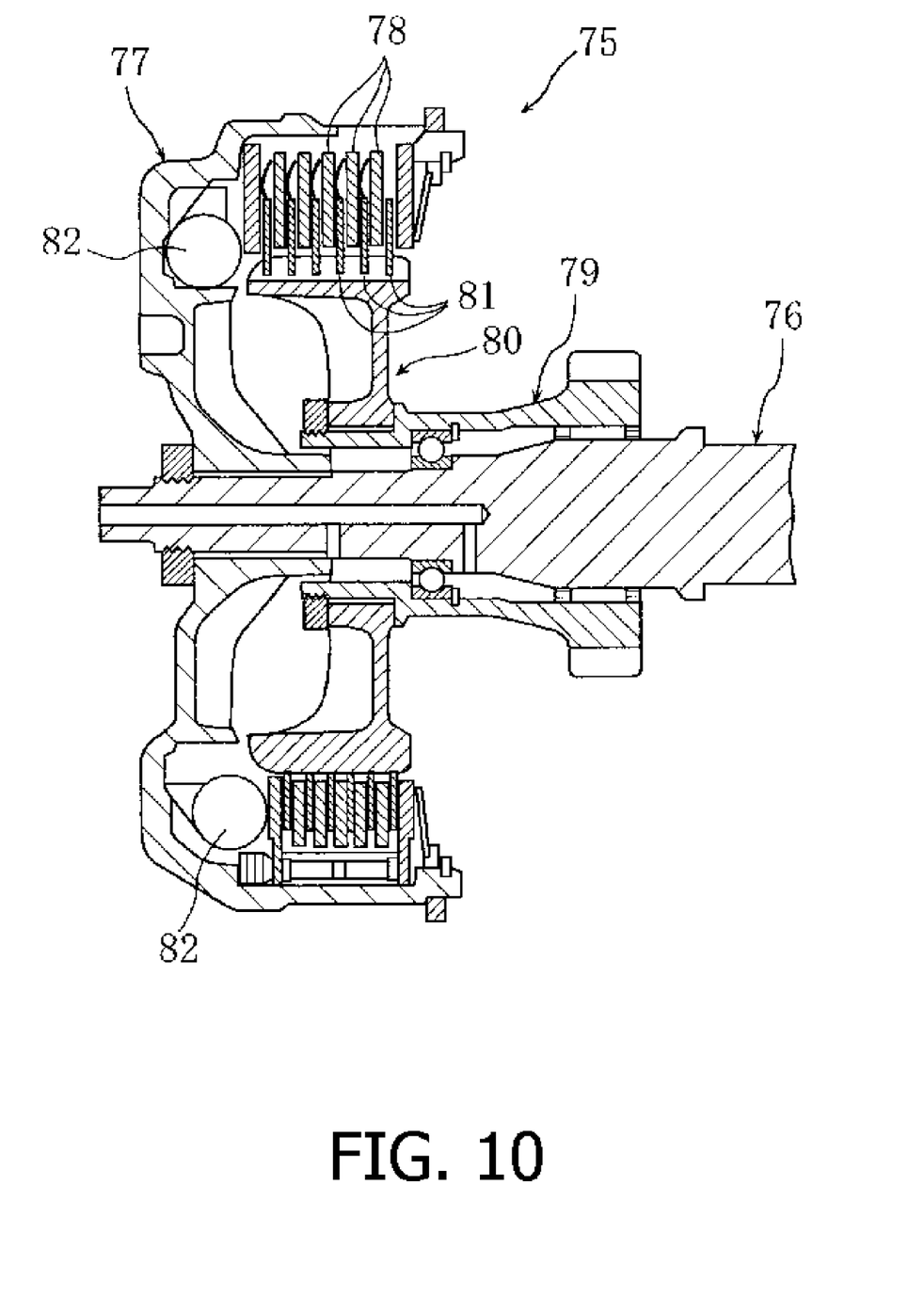
FIG. 10 is a cross-sectional view showing a dry clutch according to a second embodiment of the invention.

FIG. 10 shows a dry clutch according to a second embodiment of the present invention.

The dry clutch 75 according to the second embodiment includes a plurality of outer plates 78 configured to be engaged with an outer drum 77 fixed to an input shaft 76 so as to be rotate therewith, a plurality of inner plates 81 engaged with an inner drum 80 fixed to an output shaft 79 so as to rotate therewith, and ball weights 82 configured to be moved in a direction in which the outer drum 78 and the inner drum 81 are brought into pressure contact with each other by a centrifugal force generated by rotation of the input shaft 76. Thus, rotation of the input shaft 76 is transmitted to the output shaft 79 via the outer drum 77 the outer plates 78, the inner plates 81, and the inner drum 80.

In this second embodiment, a solid lubricant is applied to the contact surfaces between the outer plates 78 and the inner plates 81.

Third Embodiment

Figure 11:
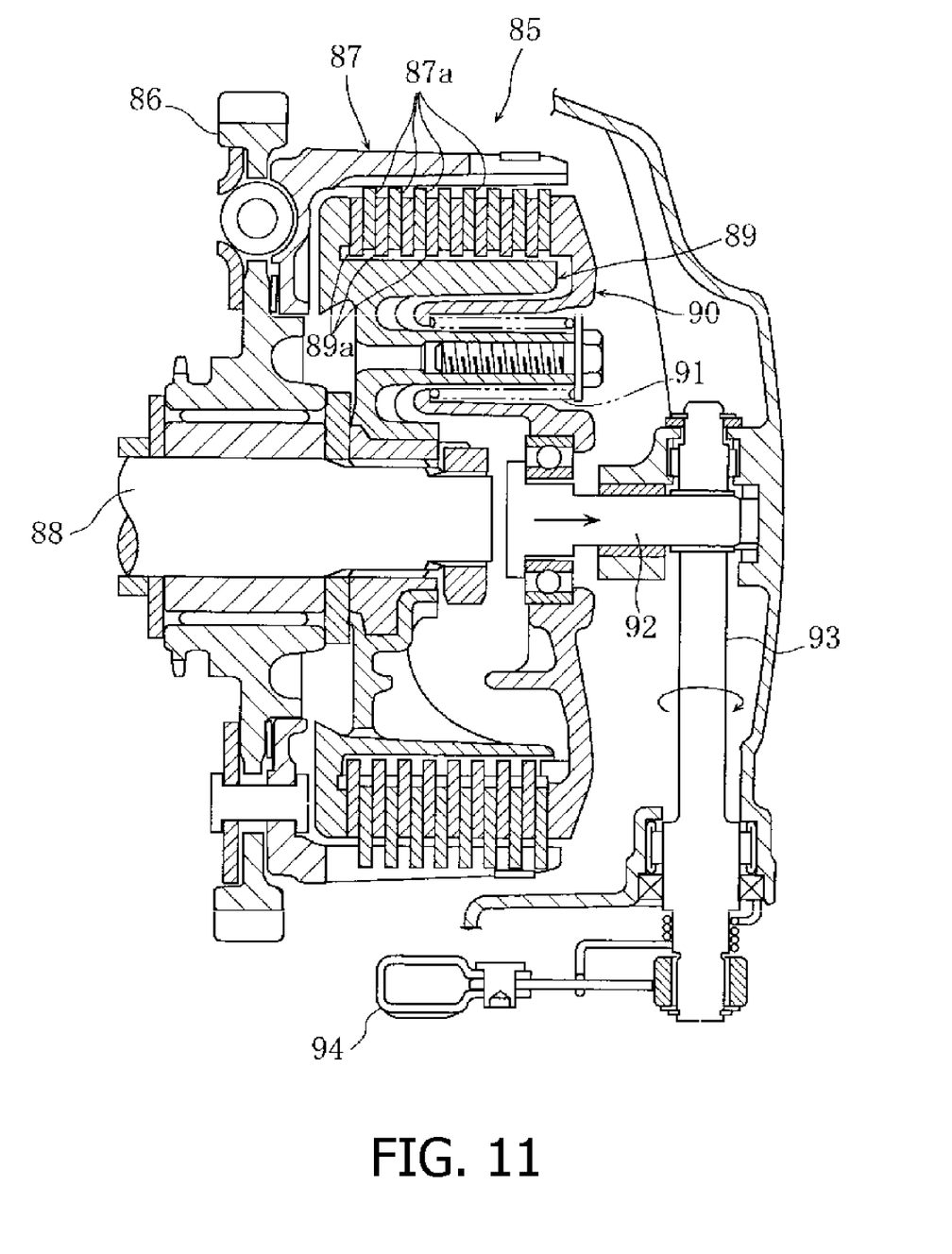
FIG. 11 is a cross-sectional view showing a dry clutch according to a third embodiment of the invention.

FIG. 11 shows a dry clutch according to a third embodiment of the invention.

The dry clutch 85 according to the third embodiment includes an outer drum 87 fixed to a reduction gear 86 engaged with a crankshaft (not shown) so as to be rotated with the reduction gear, an inner drum 89 fixed to an output shaft 88 so as to be rotated therewith, a plurality of outer plates 87a and inner plates 89a interposed between both the drums 87 and 89, and clutch springs 91 for axially bringing the outer plates 87a and the inner plates 89a into pressure contact with each other via a push plate 90 at all times. Thereby, rotation of an engine is transmitted to the output shaft 88 via the outer drum 87 and the inner drum 89.

Also, a push rod 92 is connected to the push plate 90, and a drive shaft 93 is perpendicularly engaged with the push rod 92. A clutch lever (not shown) of a steering handle is connected to the drive shaft 93 via a connecting lever 94. When a rider grips the clutch lever, the drive shaft 93 is rotated to cause the movement of the push rod 92 in a direction of compressing the clutch springs 91. This causes disengagement of the outer and inner plates 87a and 89a, resulting in interception of the transmission of engine rotation.

A solid lubricant is interposed between the contact surfaces of the outer plates 87a and the inner plates 89a.

In this manner, substantially the same effects as those in the first embodiment can be expected in the dry clutches 75 and 85 according to the second and third embodiments by interposing a solid lubricant between the contact surfaces of the outer plates 78 and 87a and the inner plates 81 and 89a.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those skilled in the art. The limitations in the claims are to be interpreted broadly based on the language employed in the claims and not limited to examples described in the present specification or during the prosecution of the application, which are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A dry clutch configured to transmit and intercept motive power by engaging a driving member and a driven member and disengaging them from each other in a non-lubricating atmosphere, the dry clutch comprising:
   a solid lubricant interposed between the driving member and the driven member, wherein
   the solid lubricant is a powder layer.

2. The dry clutch as recited in claim 1, wherein the solid lubricant is interposed between the driving member and the driven member by rubbing the solid lubricant against at least one of contact surfaces of the driving member and the driven member.

3. The dry clutch as recited in claim 1, wherein the solid lubricant is interposed between the driving member and the driven member by applying the solid lubricant on at least one of contact surfaces of the driving member and the driven member.

4. The dry clutch as recited in claim 1, wherein the solid lubricant is interposed between the driving member and the driven members by supplying the solid lubricant onto at least one of contact surfaces of the driving member and the driven member.

5. The dry clutch as recited in claim 1, wherein the solid lubricant is interposed between the driving member and the driven member by forming a layer of the solid lubricant on at least one of contact surfaces of the driving member and the driven member.

6. The dry clutch as recited in claim 1, wherein the driving member and the driven member are configured such that the driving member and the driven member engage with each other by a centrifugal force generated by rotation of the driving member and disengage from each other by a spring force.

7. The dry clutch as recited in claim 1, wherein the driving member and the driven member are configured such that the driving member and the driven member engage with each other by a spring force and disengage from each other by a driving force from outside.

8. The dry clutch as recited in claim 1, wherein the powder layer is made of carbon powder having a low coefficient of friction.

9. The dry clutch as recited in claim 1, wherein the powder layer is made of molybdenum disulfide.

10. A motorcycle equipped with the dry clutch as recited in claim 1, the motorcycle comprising:
    a dry type transmission; and
    a transmission chamber which accommodates the transmission,
    wherein the dry clutch is arranged in the transmission chamber.

11. The motorcycle as recited in claim 10,
    wherein the transmission is a V-belt type continuously variable transmission, and
    wherein the dry clutch is arranged in the transmission chamber in which the continuously variable transmission is accommodated.

12. The motorcycle as recited in claim 11,
    wherein the V-belt type continuously variable transmission comprises a driving pulley, a driven pulley, and a V-belt put on the driving pulley and the driven pulley, and
    wherein the dry clutch is arranged on a side of the driven pulley.

13. The motorcycle as recited in claim 10, further comprising an engine unit having the dry clutch,
    wherein the engine unit comprises an engine body which generates an output, and a transmission case which accommodates a V-belt type continuously variable transmission for transmitting the output to a rear wheel,
    wherein the transmission case forms the transmission chamber,
    wherein the dry clutch is accommodated in the transmission case, and
    wherein the engine body is supported by a vehicle body.

14. The motorcycle as recited in claim 13, wherein the engine body is supported by the vehicle body in an up-and-down swingable manner.

15. The motorcycle as recited in claim 13, wherein the engine body is directly supported by the vehicle body in an up-and-down swingable manner.

16. The motorcycle as recited in claim 13, wherein the engine unit is mounted on a vehicle body in an immovable manner.

17. The motorcycle as recited in claim 12,
wherein the driving member includes a shoe mounted on a driving shaft and configured to be brought into contact with a casing mounted on a driven shaft by a centrifugal force generated by rotation of the driving shaft, and
wherein the solid lubricant is arranged on a contact surface of the shoe configured to be brought into contact with the casing.

18. The motorcycle as recited in claim 12,
wherein the driven member is a casing mounted to a driven shaft and configured such that a shoe mounted on a driving shaft is brought into contact with the casing by a centrifugal force generated by rotation of the driving shaft, and
wherein the solid lubricant is arranged on a contact surface of the casing configured to be brought into contact with the shoe.

* * * * *